UNITED STATES PATENT OFFICE.

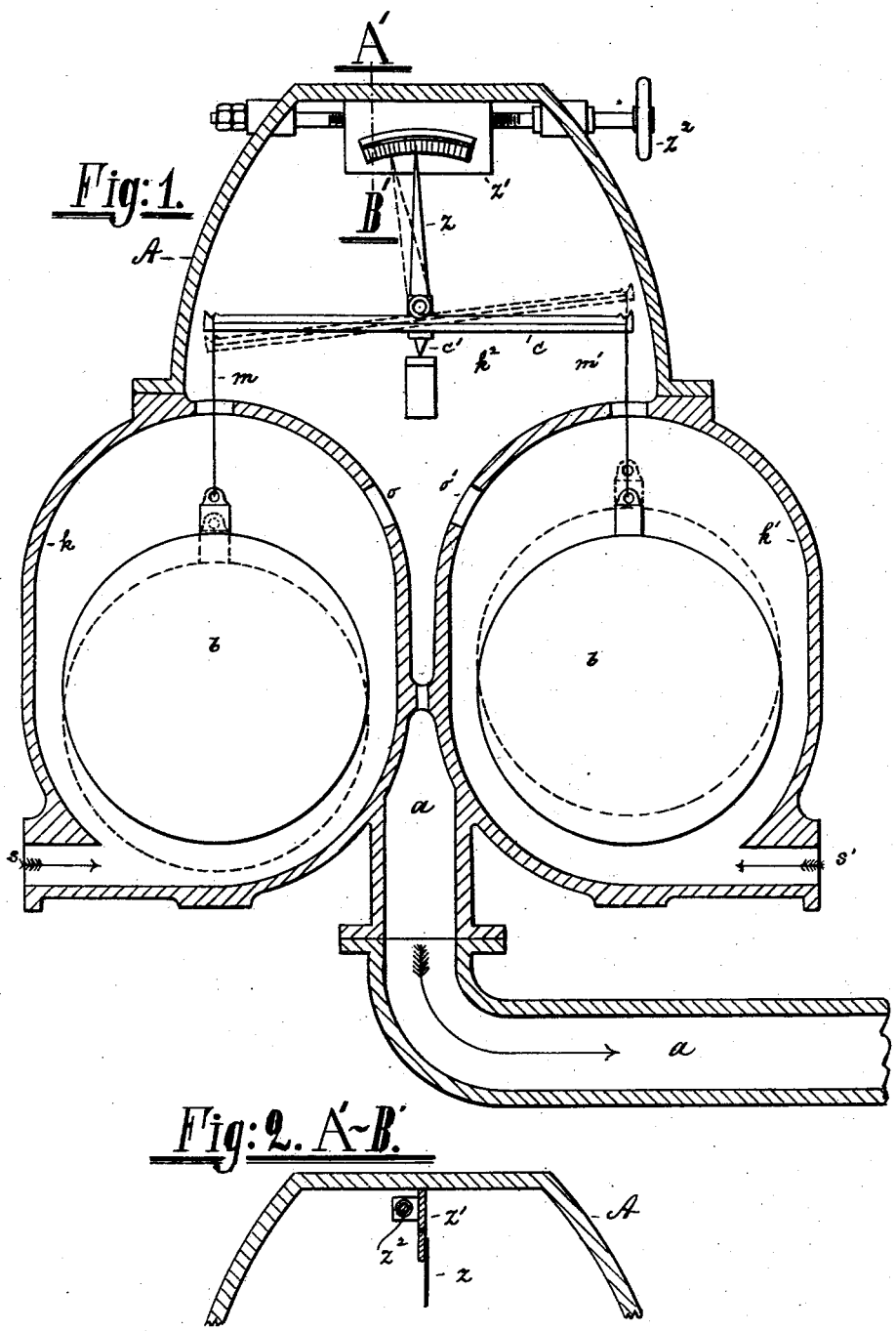

ALPHONS CUSTODIS, OF DUSSELDORF, GERMANY.

SCALE FOR WEIGHING GASEOUS SUBSTANCES.

SPECIFICATION forming part of Letters Patent No. 569,177, dated October 13, 1896.

Application filed April 24, 1895. Serial No. 546,967. (No model.)

*To all whom it may concern:*

Be it known that I, ALPHONS CUSTODIS, a subject of the German Emperor, residing at Dusseldorf, Germany, have invented certain new and useful Improvements in Scales for Weighing Gaseous Substances, of which the following is a specification.

This invention relates to a scale for ascertaining accurately the weight of gaseous substances.

The scale consists of a pair of chambers containing floats which are adapted to be moved by the gases and which operate a scale-beam provided with a pointer.

In the accompanying drawings, Figure 1 represents a vertical central section of my improved scale. Fig. 2 is a transverse section on line A' B', Fig. 1.

The letter A represents the casing of the scale, containing two chambers $k\ k'$. These chambers are provided with the separate inlet-pipes $s\ s'$ and communicate by openings $o\ o'$ with a third or joint chamber $k^2$, having a single outlet-pipe $a$. Thus by applying a suitable suction apparatus to this pipe the gases are exhausted from both chambers simultaneously. Within the chambers $k\ k'$ are contained the floats $b\ b'$, connected by ropes or chains $m\ m'$ to a scale-beam $c$, fulcrumed within chamber $k^2$ at $c'$. This scale-beam carries or operates the pointer $z$, moving over a scale $z'$.

In use air is admitted into chamber $k$ through pipe $s$ by means of a suitable suction or pressure pump, while the gas to be weighed is admitted by pipe $s'$ into the chamber $k'$. According to the different weights of the two gases, the floats $b\ b'$ will rise or fall to different heights within their chambers. Thus the floats will vibrate the scale-beam $c$, and the pointer $z$ will indicate the difference of weight upon the scale $z'$.

The scale $z'$ is rendered laterally adjustable by means of a worm $z^2$. To set the scale, the same gas or air is drawn simultaneously through both chambers, when the finger $z$ should point at zero. Should this not be the case (owing to inaccuracies of the weighing mechanism) the scale is shifted until the finger points at the zero-mark. The gases after acting upon the floats will pass into the joint-chamber $k^2$ and are thence drawn out through the common pipe $a$. Within the chamber $k^2$ a mixture of gas and air will thus be formed, which, owing to its specific gravity, will not have a tendency to reënter either of the chambers $k\ k'$. Thus it is not necessary to pack the chains $m\ m'$ where they pass out of the chambers $k\ k'$.

In order to ascertain the properties of gaseous substances, they may be simultaneously admitted into both chambers. That gas, however, which is admitted into one chamber is previously passed through a liquid, which effects a certain change in the mixture and weight of the gas. In this way the pointer will indicate the property of the gas passed through the liquid. So, for example, carbonic-acid gas may be passed through caustic soda.

My improved scale is well applicable for mines to indicate the nature of the fire-damp, and may in this case be connected to a distant electric indicator.

What I claim is—

A gas-scale provided with a pair of chambers $k$, $k'$, having inlet-orifices, a joint-chamber $k^2$, communicating with chambers $k$, $k'$, a common exhaust-pipe $a$, floats suspended within chambers $k\ k'$, a scale-beam operated thereby, a pointer secured to the scale-beam, a movable scale $z'$, and a worm $z^2$, for adjusting the scale in a lateral direction, substantially as specified.

In testimony whereof I have signed this specification in the presence of two subscribing witnesses.

ALPHONS CUSTODIS.

Witnesses:
 WILHELM ESSENWEIN,
 ERNST ANDRÉ.